UNITED STATES PATENT OFFICE.

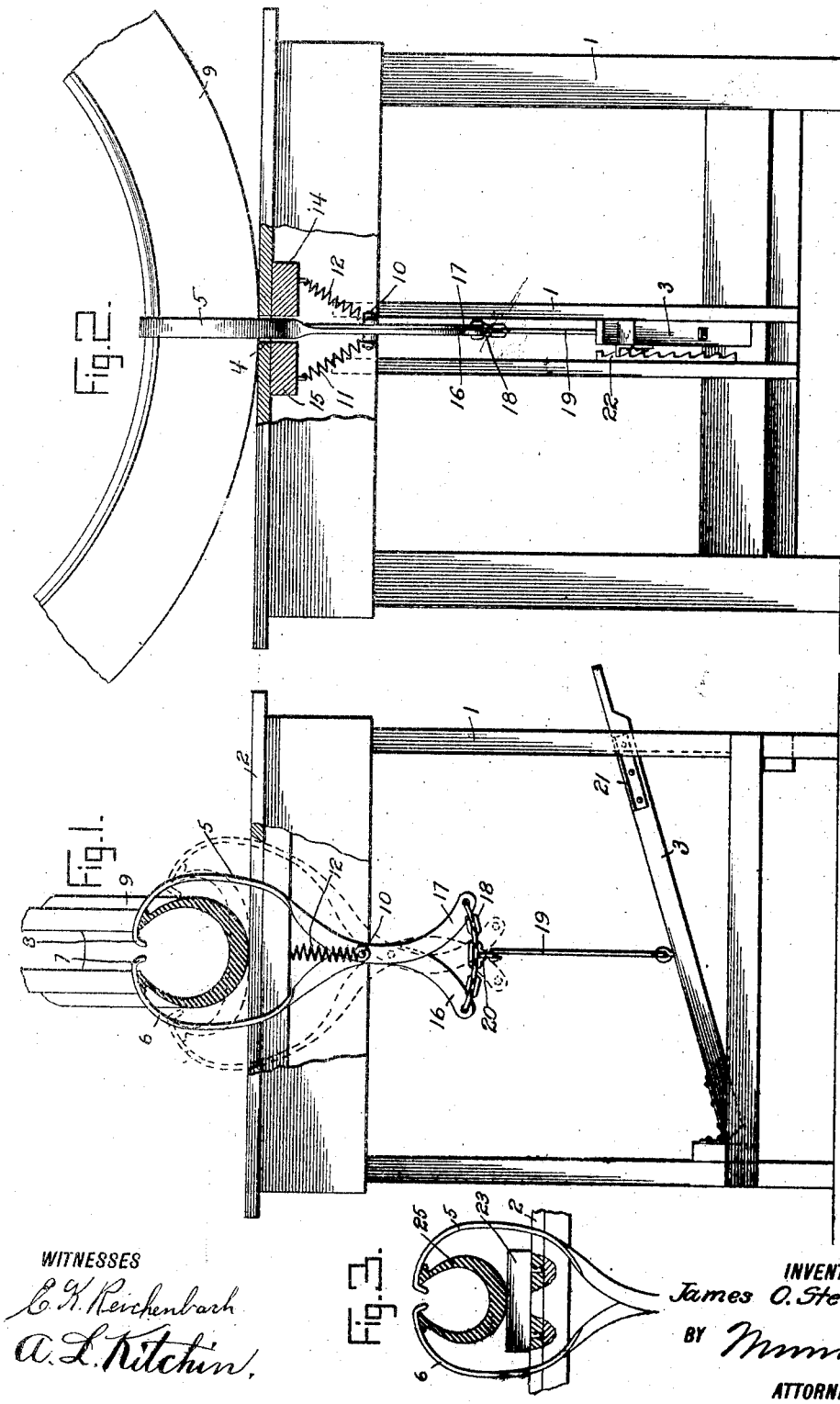

JAMES OLIVER STEWART, OF SPOKANE, WASHINGTON.

TIRE-SPREADING DEVICE.

1,087,846.

Specification of Letters Patent.  Patented Feb. 17, 1914.

Application filed April 3, 1913.  Serial No. 758,608.

*To all whom it may concern:*

Be it known that I, JAMES O. STEWART, a citizen of the United States, and a resident of Spokane, in the county of Spokane and State of Washington, have invented a new and Improved Tire-Spreading Device, of which the following is a full, clear, and exact description.

This invention relates to improvements in tire-spreading devices, and has for an object to provide an improved structure for spreading a clencher tire structure so as to permit ready inspection of the interior thereof.

Another object of the invention is to provide a spreading device for tires which may be quickly and easily operated and which will securely spread the tire without any injury thereto so as to disclose the interior surface or face.

In carrying out the objects of the invention, a table structure of any desired kind may be used with an opening therein through which a pair of tong structures are projected, the tong structures being pivotally connected below the top of the table and held supported by one or more springs. The lower ends of the tong structures are bent outwardly or away from each other so that when moved together the upper ends of the parts of the tongs will be separated. A treadle structure is connected with these outwardly-bent ends so as to allow a quick opening of the jaws or points of the tongs when a tire is engaged thereby so as to quickly open for inspection of a tire.

A practical embodiment of the invention is represented in the accompanying drawings, in which similar characters of reference indicate corresponding parts in all the views.

Figure 1 is a side elevation of a table and a pair of tongs and associated devices embodying the features of the invention, a fragment of the tire being shown in connection therewith; Fig. 2 is a side view of the structure shown in Fig. 1, the table being broken away to readily disclose the parts; and Fig. 3 discloses a fragmentary view of a table and associated devices embodying a slightly modified form of the invention.

Referring to the drawings by numerals, 1 indicates a table, of any desired kind, having a suitable top 2 and having a treadle 3 pivotally connected therewith, preferably near the bottom thereof. The top 2 is provided with a slot 4 through which is projected the jaws 5 and 6 of a pair of tongs, merging to overhanging hooks or points 7 and 8 designed to hook over the edges of a tire 9, as clearly shown in Fig. 1. Near their lower ends the jaws 5 and 6 are pivotally connected together by a suitable pin 10 which also carries springs 11 and 12. The springs 11 and 12 are connected by any desired means, as, for instance, a staple to the table 1, or to suitable reinforcing members 14 and 15 connected with the top of the table, as shown in Fig. 2. The lower ends of the jaws 5 and 6 are not crossed but curved outwardly for providing arms 16 and 17. These arms are connected by any desired form of flexible member as, for instance, a chain 18 which has a hook 19 connected with the center thereof, preferably by being hooked into a link 20 mounted upon the central link of the chain, although, if desired, the hook 19 could be directly hooked to the central link of the chain. The bottom of the hook or rod 19 is pivotally connected with the treadle 3 so that when the treadle 3 is depressed by the foot or other means the chain 18 will be pulled downwardly at its center point and thus cause the outer ends of the arms 16 and 17 to approach each other. This will cause the points 7 and 8 to spread, as shown in dotted lines in Fig. 1 and consequently to spread a tire if the same is connected therewith. In this way the tire may be quickly and easily inspected and maintained open for any desired length of time with a minimum effort.

In large automobile tires it is well known that the same are very stiff and hard to open for inspection. By arranging the jaws 5 and 6, the treadle 3 and associated parts as described, means are presented which will quickly and easily open a tire for inspection or repairs.

When it is desired to insert a tire into the jaws 5 and 6, the same may be easily grasped and moved apart, and then hooked over the tire as shown in full lines in Fig. 1.

In order to maintain the tire in open position for some considerable time, the treadle 3 is provided with a catch 21, formed substantially as an angle iron, and which is adapted to be caught beneath the teeth of a suitable rack 22. When the treadle 3 is moved downwardly, the same is, of course, moved against the action of the springs 11 and 12 as well as against the tire 9. In this way means are provided for positively returning the jaws to their former position regardless of the action of the tire.

Occasionally small tires are desired to be inspected, and when inspecting tires of this variety a block 23 is preferably arranged on the table, as shown in the modified form in Fig. 3. In this way the tire 25 though smaller than the tire 9 is opened in a similar manner and may be held open by causing the member 21 to engage the rack 22.

Having thus described my invention, I claim as new and desire to secure by Letters Patent:—

1. In a device of the character described, a support, a pair of tongs projecting through the upper part of said support, the jaws of said tongs being pivotally connected together, resilient means connecting said tongs to said support whereby the tongs may move freely up and down bodily, and means for simultaneously lowering and spreading said jaws for causing the same to engage and spread a tire on said support.

2. In a device of the character described, a support, a pair of tongs loosely mounted on the said support and projecting through the top thereof for engagement with a tire placed on the support, and means for simultaneously actuating and bodily lowering said tongs so that the jaws thereof will engage and spread said tire over the top of said support.

3. In a device of the character described, a support formed with a slot therein, a pair of tongs pivotally connected together and projecting through said slot so that the upper ends thereof may engage a tire, a spring for connecting said tongs with said support, whereby said tongs may be bodily raised and lowered and means for actuating the lower ends of said tongs so as to bodily lower the tongs and spread the upper ends in order that the upper ends may engage and spread said tire.

4. In a device of the character described, a table formed with a slot therein, said table being adapted to receive a tire designed to be spread or opened, a pair of tongs extending through said slot so that the upper ends thereof will engage said tire, the lower ends of said tongs being formed so as to extend outwardly in opposite directions, means for pivotally connecting said tongs together, a flexible member connecting the outwardly-extending ends of said tongs, and means for acting on said flexible member and causing the same to draw said outwardly-extending ends together whereby the upper ends of said tongs are separated and the tire engaged thereby is spread.

5. In a device of the character described, a supporting table formed with a slot, a pair of tongs pivotally connected together with the upper ends extending through said slot, resilient means engaging said tongs for resiliently supporting the same so that the tongs may have a free up and down movement through said slot as well as a free pivotal movement, and means for actuating the jaws of said tongs for separating the same and simultaneously moving the same downwardly through said slot whereby a tire engaged by the upper ends of said jaws will be spread.

6. In a device of the character described, a supporting table formed with a slot therein, a pair of tongs projecting through said slot, the said tongs having outwardly-flaring lower ends, means for pivotally connecting said tongs together at their point of contact, a spring for resiliently supporting said tongs in said slot, a flexible member connecting the outwardly-flaring ends of said tongs, and means engaging said flexible member for causing the same to move said flaring ends together and downwardly whereby a tire engaged by the upper ends of said tongs will be spread over said supporting table.

7. In a device of the character described, a supporting table formed with an opening therein, a pair of tongs extending through said opening and adapted to engage and spread a tire on said table, the jaws of said tongs being pivotally connected together, the lower ends of said tongs being formed so as to extend outwardly in opposite directions, a flexible member connecting said outwardly-flaring ends, an operating member connected substantially with the center of said flexible member, means for moving said operating member downwardly whereby said flexible member is caused to draw said outwardly-flaring ends toward each other and cause a corresponding separation of the upper ends of said tongs, and means for connecting said tongs with said supporting table.

8. In a device of the character described, a supporting table formed with an aperture therein, a pair of tongs projecting through said aperture, means for pivotally connecting the parts of said tongs together, a treadle for actuating said tongs and causing the upper ends thereof to engage and spread a tire, a catch secured to said treadle, and a rack adapted to engage said catch for locking the treadle in any desired position.

9. In a device of the character described, a supporting table formed with an aperture therein, a pair of tongs with the upper ends projecting through said aperture, means for pivotally connecting said tongs together, a spring connected with said pivotal means and with said supporting table for supporting the tongs, means for actuating said tongs for separating the upper ends thereof and moving the upper ends downwardly, and a filling or supporting block arranged between said tongs for supporting a tire in such position as to cause the same to properly engage the upper ends of said tongs.

In testimony whereof I have signed my name to this specification in the presence of two subscribing witnesses.

JAMES OLIVER STEWART.

Witnesses:
 JAMES A. BROWN,
 H. C. HINES.